Figure 1:
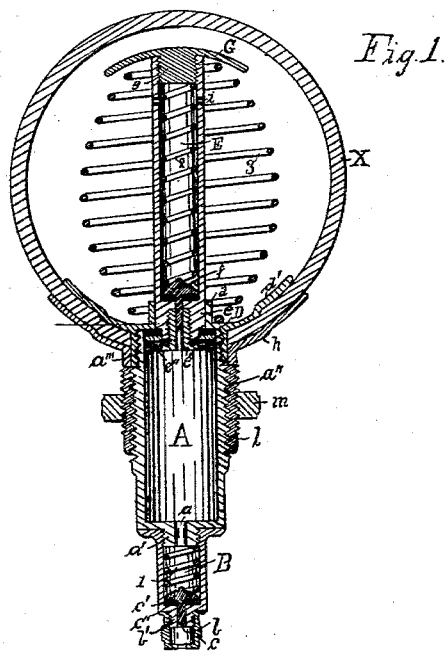

(No Model.)

J. K. TOMLINSON.
AUTOMATIC BICYCLE PUMP.

No. 561,628. Patented June 9, 1896.

WITNESSES:
Fred W. Beal.
Sydney B. Davis.

INVENTOR.
James K. Tomlinson.
BY
George M. Davis
ATTORNEY.

UNITED STATES PATENT OFFICE.

JAMES K. TOMLINSON, OF TERRE HAUTE, INDIANA, ASSIGNOR OF TWO-FIFTHS TO ELNATHAN D. HARVEY, OF SAME PLACE.

AUTOMATIC BICYCLE-PUMP.

SPECIFICATION forming part of Letters Patent No. 561,628, dated June 9, 1896.

Application filed April 24, 1895. Serial No. 546,974. (No model.)

*To all whom it may concern:*

Be it known that I, JAMES K. TOMLINSON, a citizen of the United States, residing in Terre Haute, in the county of Vigo and State of Indiana, have invented certain new and useful Improvements in Automatic Bicycle-Valves; and I do hereby declare that the following is a full, clear, and exact description of the invention, which will enable others skilled in the art to which it appertains to make and use the same, reference being had to the accompanying drawing, and to the letters and figures of reference marked thereon, which forms part of this specification.

My invention relates to that class of automatic valves which are used for the purpose of inflating and deflating pneumatic tires for bicycles or other similar vehicles and in which the various valve-plungers are opened and closed by the expansion and contraction of air within an air-chamber or cylinder, as hereinafter described.

The objects of my invention are, first, to provide a strong and substantial valve whereby a pneumatic tire may be inflated with ease and rapidity; second, to provide a valve which will automatically inflate the tube of a tire to the required tension when the tube is either partially or wholly deflated; third, to provide a valve which will automatically replace air-pressure when the same becomes decreased by means of punctures and other accidental leakages, and, fourth, to provide a valve which will automatically inflate the tube of a pneumatic tire to the required tension and proportionate to the varying weights of loads to be supported by the tire. I attain these objects by means of the mechanism described in the drawing hereto annexed, in which the figure is a view of a perpendicular cross-section of the valve and a pneumatic-tire tube.

The letter A indicates a metallic cylinder or air-chamber, which is closed at one end and open at the other. An aperture or air-vent $a$ is drilled through the center of the closed end of the cylinder A, and said air-vent extends through a cylindrical shoulder $a'$. A strong screw-thread $a''$ is cut upon the outer surface of the cylinder A, extending from a short distance from the closed end to within a short distance from the other end of the cylinder, and the remaining portion of the outer surface of the cylinder A, at the open end thereof, is turned down, making a shoulder $a'''$, around which is cut another thread.

The letter B indicates a valve-jacket, which is screwed onto the closed end of the cylinder A. The outer end of the valve-jacket B is closed, with the exception of an air-vent $b$, which passes through its center, and a short threaded shoulder $b'$ projects from the closed end for the purpose of receiving the threaded cap $c$. This cap has an air-vent passing through its closed or outer end.

The letter $c'$ indicates a valve-plunger, the tip of which extends into the air-vent $b$, and which, together with its rubber washer $c''$, finds a seat against the inner wall of the closed end of the valve-jacket B, being held against its seat-face by a spiral spring 1, which spring in turn rests upon the closed end of the cylinder A, as shown in the drawing.

The letter D indicates an inwardly-threaded cap which is screwed onto the shoulder $a'''$ of the cylinder A. This cap has an aperture through its closed end, around which is struck up the sleeve $d$, for the purpose hereinafter set out.

From the edge of the cap D, formed by its end and side walls, there extends a curved flange-like clamp-jaw $d'$, the curvature of which corresponds, except for a slight corrugation, to the curvature of a pneumatic-tire tube X.

The letter E indicates a tube-like piston which exactly fits and slides through the sleeve $d$ and the aperture of the cap D. One end of the piston E is closed by a short solid portion $e$, through which an aperture or air-vent passes. This aperture is enlarged at the outer end and internally threaded to receive a hollow screw $e'$. A small shoulder or recess is turned upon the end of said solid portion $e$, into which a piston-head $e''$ is clamped by the hollow screw $e'$. The said piston-head consists of a metallic washer, upon both sides of which is a rubber or other impervious washer, and is of such size that it will exactly fit into the cylinder or air-chamber A, for the purpose hereinafter set out. The other end of the piston E is hollow and internally threaded to receive the cap G, said cap having a broad curved head, the curvature of which corresponds with the curvature of a tire-tube.

Two or more outlet-apertures $i$ are drilled through the walls of the piston E, near the open end thereof. A rubber-tipped valve-plunger $f$ finds its seat against the inner wall of the solid portion $e$ of the piston, the tip of said valve extending into the aperture thereof. The valve $f$ is held against its valve-seat by means of a spiral spring 2, the other end of which rests against the threaded shank $g$ of the cap G. A strong spiral spring 3 rests between the curved surfaces of the cap G and the cap D, and when in its normal condition holds the piston-head $e''$ down and against the cap D.

The letter $h$ indicates a clamp-jaw, which consists of a short sleeve which fits over and around the cap D, and a flange similar to the flange $d'$, together with which it forms a clamp, between which the wall of a pneumatic-tire tube is clamped.

The letter $l$ indicates an inwardly and outwardly threaded set-sleeve, which screws onto the outside of the cylinder A, and the letter $m$ indicates an internally-threaded set-washer, which screws over the set-sleeve $l$, for the purpose hereinafter set out.

To mount my valve, I insert the cap G, the piston E, and cap D into the inner tube of a pneumatic tire, thus placing the flange $d'$ against the inner wall of the tube. Then by means of the set-sleeve $l$ I force the clamp-jaw $h$ down upon the surface of the tube, thereby clamping the tube between the two flanges $d'$ and $h$. The outer end of the valve is then passed through the aperture made for that purpose through the rim of the wheel upon which the tire is mounted, where it is firmly fixed and held by means of the set-washer $m$ being screwed firmly against said rim. Having adjusted my valve, as described, I have only to compress and release the tire-tubing, thereby bringing pressure upon the cap G, which in turn forces the piston backward and forward in the cylinder or air-chamber A in order to inflate the tire-tube.

The inflation of the tire is brought about in the following manner: By compressing and releasing the tire just over the cap G the piston, with its piston-head, will be forced into the cylinder or air-chamber A, the effect of which will be to compress the air within the cylinder or air-chamber A, thereby forcing the valve $f$ to open and admit the air from A into the hollow piston and from there into the cavity of the tire-tube through the vents $i$. Upon releasing the pressure upon the piston it will be forced back to its normal position by means of the properly-adjusted spring 3, leaving a vacuum within the cylinder A, whereby the valve $c'$ will be opened by suction and the air-pressure from without, allowing air to enter through the air-vent in the cap $c$ and thence into the chamber A until said chamber is full, when the valve $c'$ will be closed by means of the spring 1 within the cap B. By a succession of such compressions of the tire-tube the tire will be inflated to the proper degree of tension, after which it will be impossible to further compress the tire or operate the valve.

In case of a puncture being sustained by the tire when in use the leakage of air will partially deflate the tire-tube and the valve will be forced to pump air by the mere jolting of the wheel until the tire is inflated to such a degree that the piston will not be forced into the cylinder or chamber A by the revolution of the tire. Thus any small amount of leakage will be immediately replaced automatically while the wheel upon which the tire is mounted is in motion.

I have described my invention as applied to single-tube tires; but the same may be used on double-tube tires by simply making an aperture in the outer tube large enough to allow the set-sleeve $l$ to pass through and mounting the valve upon the inner tube, as described above.

Since the cap D and set-sleeve $l$ are tubular parts independently screwed on the two exterior sets of screw-threads of the cylinder, and since the set-washer is a binding or clamping ring threaded internally and engaging the external screw-threads of said set-sleeve, the fastening of the said cylinder in proper position to the said tire is made very secure.

What I claim as my invention, and desire to secure by Letters Patent, is—

In combination with a tubular elastic tire, a cylinder A attached to the inner face thereof, and externally screw-threaded with two series of threads, tubular parts provided with internal threads for engaging respectively therewith and having flanges $d'$ and $h$ that fit respectively against the interior and the exterior faces of the tire surrounding the point of attachment of the said cylinder, a clamping-ring $m$ screwed upon the outer one of the said tubular parts, a tubular piston arranged to slide in the said cylinder, extending within the said tire nearly to the front or tread thereof, and communicating both with the interior of the said tire and the interior of the said cylinder, a spring 3 surrounding the said piston and pressing it outward toward the tread of the tire, and inlet-valves governing respectively the admission of external air to the said cylinder and the passage of air from the said cylinder to the said piston substantially as set forth.

In testimony that I claim the foregoing as my own I affix my signature in presence of two witnesses.

JAMES K. TOMLINSON.

Witnesses:
  SYDNEY B. DAVIS,
  ED. MANLOVE.